United States Patent
Monaco et al.

(10) Patent No.: US 12,361,096 B1
(45) Date of Patent: Jul. 15, 2025

(54) INTELLIGENT DATA INTEGRATION SYSTEM

(71) Applicant: Provenir, Inc., Parsippany, NJ (US)

(72) Inventors: Raymond A. Monaco, Killeen, TX (US); Veejay Jadhaw, Princeton, NJ (US); Anand Shah, Morris Plains, NJ (US)

(73) Assignee: Provenir, Inc., Parsippany, NJ (US)

( * ) Notice: Subject to any disclaimer, the term of this patent is extended or adjusted under 35 U.S.C. 154(b) by 0 days.

(21) Appl. No.: 18/914,789

(22) Filed: Oct. 14, 2024

(51) Int. Cl.
*G06F 18/30* (2023.01)
*G06F 18/2321* (2023.01)

(52) U.S. Cl.
CPC .......... *G06F 18/2321* (2023.01); *G06F 18/30* (2023.01)

(58) Field of Classification Search
CPC ....... G06F 18/2321; G06F 18/00; G06F 18/30
See application file for complete search history.

(56) References Cited

U.S. PATENT DOCUMENTS

| | | | | |
|---|---|---|---|---|
| 9,516,053 | B1* | 12/2016 | Muddu | G06F 16/9024 |
| 11,526,261 | B1* | 12/2022 | Leach | G06F 17/18 |
| 2016/0359872 | A1* | 12/2016 | Yadav | H04L 63/1408 |
| 2019/0370233 | A1* | 12/2019 | Yamashita | G06F 16/254 |
| 2021/0034338 | A1* | 2/2021 | Galchenko | G06Q 10/06316 |
| 2023/0368878 | A1* | 11/2023 | Molenda | G16H 70/60 |
| 2024/0143581 | A1* | 5/2024 | Tripathi | G06F 16/22 |

* cited by examiner

*Primary Examiner* — Merilyn P Nguyen
(74) *Attorney, Agent, or Firm* — DLA Piper LLP (US)

(57) ABSTRACT

A computing system receives an indication of one or more data sources for a data integration process. The computing system interfaces with the one or more data sources to receive the data for analysis. The computing system analyzes using one or more artificial intelligence models or one or more statistical models to recognize patterns and relationships within the data by identifying commonalities, dependencies, and structures that exist across the data. The computing system generates a mapping strategy based on the identified patterns and the identified relationships in the data. The computing system maps the data from the one or more data sources to the selected destination in accordance with the mapping strategy. The computing system generates a graphical user interface that visualizes the mapping strategy for display on a user device.

17 Claims, 9 Drawing Sheets

INTELLIGENT DATA INTEGRATION SYSTEM

FIELD OF DISCLOSURE

The present disclosure generally relates to an intelligent data integration and a graphical user interface for facilitating the data integration process.

BACKGROUND

Organizations typically have large swaths of data that require constant or near constant analysis and organization. Given the various different types of data that exists (e.g., static vs. real-time data) there are various challenges for organizations in managing and/or mapping the data in an efficient fashion.

SUMMARY

In some embodiments, a method is disclosed herein. A computing system receives an indication of one or more data sources for a data integration process. The data integration process maps data from the one or more data sources to a selected destination. The computing system interfaces with the one or more data sources to receive the data for analysis. The computing system analyzes, using one or more artificial intelligence models or one or more statistical models to recognize patterns and relationships within the data by identifying commonalities, dependencies, and structures that exist across the data. The computing system generates a mapping strategy based on the identified patterns and the identified relationships in the data. The computing system maps the data from the one or more data sources to the selected destination in accordance with the mapping strategy. The computing system generates a graphical user interface that visualizes the mapping strategy for display on a user device.

In some embodiments, a non-transitory computer readable medium is disclosed herein. The non-transitory computer readable medium includes one or more sequences of instructions, which, when executed by a processor, causes a computing system to perform operations. The operations include receiving, by the computing system, an indication of one or more data sources for a data integration process. The data integration process maps data from the one or more data sources to a selected destination. The operations further include interfacing, by the computing system, with the one or more data sources to receive the data for analysis. The operations further include analyzing, by the computing system, using one or more artificial intelligence models or one or more statistical models to recognize patterns and relationships within the data by identifying commonalities, dependencies, and structures that exist across the data. The operations further include generating, by the computing system, a mapping strategy based on the identified patterns and the identified relationships in the data. The operations further include mapping, by the computing system, the data from the one or more data sources to the selected destination in accordance with the mapping strategy. The operations further include generating, by the computing system, a graphical user interface that visualizes the mapping strategy for display on a user device.

In some embodiments, a computing system is disclosed herein. The computing system includes a processor and a memory. The memory has programming instructions stored thereon, which, when executed by the processor, causes the computing system to perform operations. The operations include receiving, by the computing system, an indication of one or more data sources for a data integration process. The data integration process maps data from the one or more data sources to a selected destination. The operations further include interfacing, by the computing system, with the one or more data sources to receive the data for analysis. The operations further include analyzing, by the computing system, using one or more artificial intelligence models or one or more statistical models to recognize patterns and relationships within the data by identifying commonalities, dependencies, and structures that exist across the data. The operations further include generating, by the computing system, a mapping strategy based on the identified patterns and the identified relationships in the data. The operations further include mapping, by the computing system, the data from the one or more data sources to the selected destination in accordance with the mapping strategy. The operations further include generating, by the computing system, a graphical user interface that visualizes the mapping strategy for display on a user device.

BRIEF DESCRIPTION OF THE DRAWINGS

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

Figure 1:
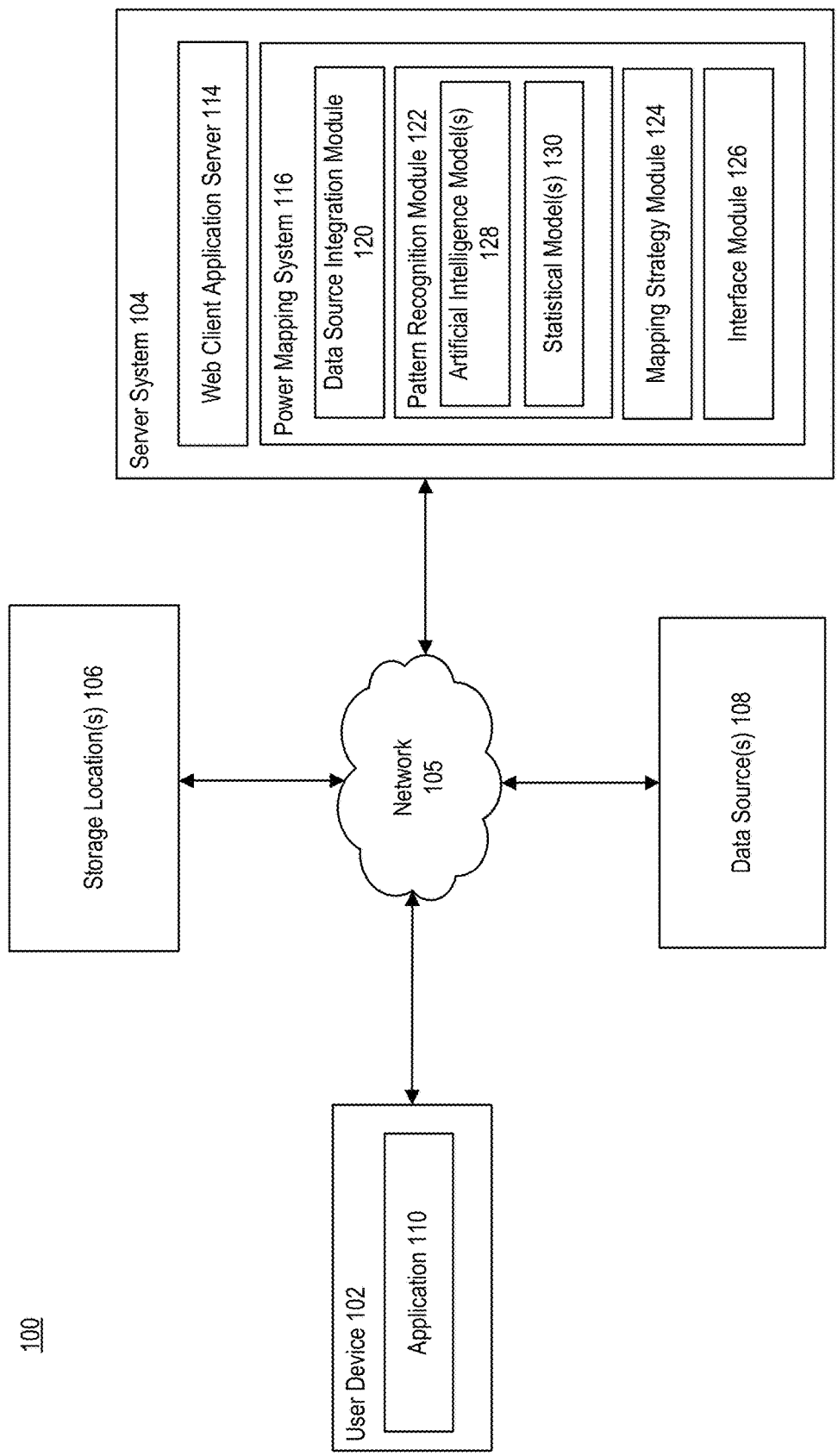
FIG. 1 is a block diagram illustrating a computing environment, according to example embodiments.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

Traditionally, organizations struggle in managing complex data mapping problems for a variety of technological limitations. Typically, for example, organizations have data spread across multiple systems and sources, which often leads to fragmentation of the data. Further, due to the data originating from multiple system and sources, the data itself may vary significantly in terms of structure, format, and semantics, making it challenging for system to integrate the data effectively. Moreover, with the increasing prevalence of live streaming data sources, organizations require solutions that can integrate data in real-time, which current approaches to data mapping are unable to handle. When the mapping begins, current techniques are limited to manually mapping the data, which results in a time-consuming and error-prone process, particularly when dealing with large datasets or complex relationships among the data. Such inaccurate or inconsistent data mappings can lead to erroneous analysis and decision-making, further complicating the process. The Power Mapper/Auto Mapper's real-time optimization ensures that mappings remain accurate and up-to-date, maintaining data integrity across the organization.

One or more techniques described herein improve upon conventional approaches by providing a state-of-the-art data integration solution that revolutionizes the way organizations manage complex data mapping problems. For example, one or more techniques disclosed herein provide a power mapper system that is able to handle a variety of data sources, including static data sources and live streaming data feeds, for the creation of one-to-many, one-to-many, and many-to-many mappings. By being able to integrate data from disparate sources, such as databases, files, and live streaming feeds, the power mapper system eliminates data fragmentation during the data integration process, thus providing a more cohesive view of the information.

In some embodiments, the power mapper system may employ generative artificial intelligence algorithms to analyze and understand the intricate relationships among the data, such as complex data structures, formats, and relationships that traditional approaches are unable to handle. The power mapper system is able to autonomously recognize patterns within the data to intelligently map data elements regardless of their complexity.

In some embodiments, the power mapper system may be configured to handle real-time data integration, allowing organizations to ingest and process data streams as they occur. This capability ensures that organizations have access to the most up-to-date information, enabling timely decision-making and response to changing conditions. Because the power mapper system utilizes artificial intelligence algorithms in the analysis of the data, the power mapper system significantly reduces the complexity of complex data mapping problems by automating the mapping process, thus reducing the need for manual intervention and significantly improve efficiency.

Additionally, the power mapper system boasts robust performance and scalability, capable of handling both small-scale tasks and large enterprise projects efficiently.

Overall, the one or more techniques disclosed herein provide organizations with a powerful and efficient tool for data integration, enabling them to overcome the challenges of fragmented data, complexity, and real-time processing. By simplifying the integration process and ensuring data accuracy and consistency, the power mapper system disclosed herein empowers organizations to make informed decisions and derive valuable insights from their data assets.

FIG. 1 is a block diagram illustrating a computing environment 100, according to example embodiments. Computing environment 100 may include user device 102, server system 104, storage location 106, and data sources 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

User device 102 may be operated by a user, such as, for example, a user associated with an organization. User device 102 may be representative of a mobile device, a tablet, a desktop computer, or any computing system having the capabilities described herein. User device 102 may include an application 110 executing thereon. Application 110 may be representative of an application associated with server system 104. For example, application 110 may be representative of an application that utilizes a data integration tool, such as power mapper system associated with server system 104. In some embodiments, application 110 may be a standalone application associated with server system 104, such as a mobile application, tablet application, desktop application, or, more generally, a software application affiliated with an entity associated with server system 104. In some embodiments, application 110 may be representative of a web browser configured to communicate with server system 104, such that an end user may gain access to the power mapper system of server system 104 via a web browser. More generally, application 110 may be configured to provide an interface between user device 102 and server system 104 for the purpose of allowing a user to access the power mapper system.

Server system 104 may be representative of one or more servers configured to communicate with one or more user devices, such as user device 102. In some embodiments, server system 104 may be configured to host one or more virtualization elements (e.g., virtual machines or containers), such that components of server system 104 may be upscaled or downscaled, depending on demand or user request.

Server system 104 may include web client application server 114 and power mapper system 116. Power mapper system 116 may be representative of an intelligent data integration tool that is able to handle a variety of data sources, including static data sources and live streaming data feeds, for the creation of one-to-many, one-to-many, and many-to-many mappings.

Power mapper system 116 may include data source integration module 120, pattern recognition module 122, mapping strategy module 124, and interface module 126. Each of data source integration module 120, pattern recognition module 122, mapping strategy module 124, and interface module 126 may be comprised of one or more software modules. The one or more software modules are collections of code or instructions stored on a media (e.g., memory of server system 104) that represent a series of machine instructions (e.g., program code) that implements one or more algorithmic steps. The machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Data source integration module 120 may be configured to interface with desired data sources. For example, data source integration module 120 may be configured to interface with data sources 108. In some embodiments, data sources 108 may be representative of data sources internal to an organization associated with user device 102. In some embodiments, data sources 108 may be representative of data sources external to the organization but associated with the organization associated with user device 102. In some embodiments, data sources 108 may be representative of third-party data sources (e.g., WKATA, Equifax, Experian, TransUnion, and the like). In some embodiments, data sources 108 may include static data sets stored in databases or files. In some embodiments, data sources 108 may include non-static data sets, such as live streaming data feeds. In some embodiments, data source integration module 120 may connect to one or more data sources 108 to access the required data for mapping.

In some embodiments, static data sets may correspond to data stored in a database. Power mapper system 116 may connect to a database (e.g., SQL databases, NoSQL databases) using one or more database connection protocols (e.g., Java Database Connectivity (JDBC) drivers are available for SQL databases, while specific drivers are available for NoSQL databases like MongoDB and Cassandra). In some embodiments, power mapper system 116 may require the user to enter connection details, such as, but not limited to the database URL, username, password, and any authentication tokens required. Once connected, the system can query and retrieve data from static datasets.

In some embodiments, static data sets may correspond to data sets stored in files (e.g., CSV, JSON, XML). In some embodiments, power mapper system 116 the system can connect directly to the file system or access them via a network file system (NFS) or cloud storage service (e.g., Amazon S3, Google Cloud Storage). To make the connection, the user may provides the file path or URL to power mapper system 116, and power mapper system 116 may parse the contents of the file for further processing.

In some embodiments, non-static data sets may include data hosted on streaming platforms. In some embodiments, such as for live streaming data feeds, power mapper system 116 may connect to platforms or services like Apache Kafka, AWS Kinesis, Google Pub/Sub, or real-time APIs provided by various services. Subscribers may subscribe to specific topics or channels within the streaming platform, and power mapper system 116 may continuously ingest data from these streams.

In some embodiments, power mapper system 116 may interface with one or more real-time APIs to access non-static data. For example, power mapper system 116 may be able to connect to real-time APIs provided by external services (e.g., financial data providers and IoT devices). In some embodiments, API endpoints are set up, and power mapper system 116 may receive push notifications when new data is available or sends requests at regular intervals (polling). API connections typically require authentication credentials (API keys, OAuth tokens) and request parameters to ensure the correct data is retrieved.

In addition to establishing, maintaining, and managing data connections, server system 104 may ensure secure communication between power mapper system 116 and the data sources, using, for example, encrypted channels (e.g., SSL/TLS). For databases and static files, server system 104 may cache data locally to reduce latency and improve performance.

As for non-static data sources, server system 104 may continuously monitor and manage the connection, ensuring data is ingested and processed in real-time. Incoming streaming data may also be buffered to handle bursts or to synchronize with downstream processing components.

To set up various connections to these data sources, server system 104 may provide users with a user-friendly interface to configure data source connections. This interface may include forms to input database credentials, select files, specify API endpoints, or configure streaming subscriptions. Power mapper system 116 may further provide options for testing the connection before fully integrating the data source.

In some embodiments, power mapper system 116 may allow users to view the status of data source connections through dashboards or monitoring tools, which include metrics such as connection uptime, data flow rates, and any errors encountered during data ingestion.

In some embodiments, to prevent unauthorized access or data breaches, data transmitted between the data sources and server system 104 may be encrypted. In some embodiments, to restrict access to sensitive data sources, configure connections, or connect to certain data sources, server system 104 may implement role-based access control (RBAC).

By supporting connections to both static and non-static data sources, power mapper system 116 may offer flexibility in handling a wide variety of data types and ensures that users can work with the most up-to-date information available, regardless of whether the data is stored in a traditional database, in a flat file, or streaming in real-time.

Pattern recognition module 122 may be configured to analyze the data received from data sources 108 and identify patterns or relationships among the data. In some embodiments, pattern recognition module 122 may include one or more artificial intelligence models 128. One or more artificial intelligence models 128 may be trained to understand the data retrieved or received from data sources 108 and identify patterns or relationships contained therein. Pattern recognition module 122 may deploy one or more artificial intelligence models 128 to recognize patterns and relationships within the data by identifying commonalities, dependencies, and structures that exist across the different datasets.

In some embodiments, one or more artificial intelligence models 128 may include generative artificial intelligence models based on transformer networks, deep neural networks, generative adversarial networks, variational autoencoders, regressive-based models, and the like. In some embodiments, the specific type of artificial intelligence model 128 may vary depending on various factors, such as, but not limited to the nature of the data, the complexity of the mapping tasks, and/or the desired performance characteristics.

In some embodiments, one or more artificial intelligence models 128 may include a deep neural network that includes layers of interconnected nodes (e.g., neurons) that are arranged in a hierarchical manner. Deep neural networks' ability to learn complex patterns and relationships within data makes them suitable for tasks such as detecting patterns and extracting features.

In some embodiments, one or more artificial intelligence models 128 may include a convolutional neural network (CNN). CNNs are particularly good at analyzing spatial data, such as images. Convolutional layers of the CNN are used to automatically learn hierarchical representations of data, making them useful for tasks like image recognition and natural language processing. Accordingly, CNNs may be useful when the data integration involves image based data.

In some embodiments, one or more artificial intelligence models 128 may include a recurrent neural network (RNN). RNNs may be used when the data requires a time series analysis, sequence prediction, or language modeling because RNNs are designed to handle sequential data by maintaining an internal state that captures temporal dependencies.

In some embodiments, one or more artificial intelligence models 128 may include a generative adversarial network, which typically includes two neural networks-a generator network and a discriminator network. GANs may be used for data augmentation tasks and synthesis as GANs are particularly adept at generating synthetic data that closely resembles real data distributions.

In some embodiments, in addition to or in lie of artificial intelligence models 128, pattern recognition module 122 may employ one or more statistical models 130. Statistical models 130 may be used to enhance data integration capabilities and artificial intelligence capabilities of power mapper system 116. For example, pattern recognition module 122 may employ one or more statistical models 130 to analyze data distributions, estimate parameters, and make predictions based on observed data patterns.

In some embodiments, statistical models 130 may include a linear regression model for modeling the relationship between a dependent variable and an independent variable in the data sets. Pattern recognition module 122 may employ a linear regression model to estimate linear relationships between data attributes and inform mapping decisions based on those relationships.

In some embodiments, statistical models 130 may include a logistic regression model for modeling binary or categorical outcomes in the data sets. Pattern recognition module 122 may employ a logistic regression model to predict categorical mappings or classify data instances by their attributes in the context of data integration.

In some embodiments, statistical models 130 may include a multivariate analysis in which multiple variables are analyzed simultaneously using techniques such as principal component analysis (PCA) or factor analysis. Pattern recognition module 122 may employ multivariate analysis techniques to identify underlying patterns and reduce the dimensionality of the data, thereby facilitating more efficient data integration.

In some embodiments, statistical models 130 may include one or more clustering models (e.g., k-means clustering) to cluster similar data points into clusters in accordance with the characteristics of the data. Pattern recognition module 122 may employ one or more clustering algorithms to identify commonalities or associations between data instances, guiding mapping decisions and strategy development in the context of data integration.

In some embodiments, statistical models 130 may include ARIMA models and seasonal decomposition to analyze temporal patterns and trends in sequential data. Pattern recognition module 122 may employ one or more of ARIMA models or seasonable decomposition to integrate time-series data streams and predict future data patterns using these techniques.

In some embodiments, statistical models 130 may include Bayesian statical models to provide a probabilistic framework for inferring and predicting based on observed data and prior knowledge. Pattern recognition module 122 may employ Bayesian methods in to enhance the robustness and reliability of mapping decisions by incorporating prior beliefs or domain expertise into the data integration process.

In some embodiments, statistical models 130 may include hypothesis testing techniques, such as t-tests or chi-square tests, to assess the significance of observed differences or associations in data samples. For example, pattern recognition module 122 may employ hypothesis testing techniques to ensure statistical rigor in the integration process, such as for validating data mapping decisions.

Mapping strategy module 124 may be configured to generate a strategy of mapping data from data source to destination based on insights gained from the pattern and relationship recognitions identified by pattern recognition module 122. For example, mapping strategy module 124 may be configured to dynamically select the most effective mapping strategies for a given integration task. Mapping strategy module 124 may be configured to determine whether a one-to-one, one-to-many, or many-to-many mapping approach is appropriate, considering factors such as data complexity and desired outcomes.

In some embodiments, mapping strategy module 124 may determine a mapping strategy by detecting patterns in the data. For example, mapping strategy module 124 may analyze the data from the source and destination. During the analysis, mapping strategy module 124 may identify relationships, structures, and patterns within both the source data and the intended destination. Mapping strategy module 124 may recognize or identify the type of data involved (e.g., numerical, categorical, time-series), the relationships among the data, such as if data entities are related (e.g., primary keys, foreign keys) and how they manifest), and/or recurring patterns in the data that may indicate the need for complex mappings (e.g., hierarchical structures, nested relationships). Based on the recognized patterns and relationships, mapping strategy module 124 may generate various insights, such as, but not limited to, the complexity of the data, such as how many fields in the source relate to fields in the destination, that may need to be understood and business rules and expected results that may be used in determining what the final mapped data should look like.

In some embodiments, mapping strategy module 124 may determine a mapping strategy by dynamically selecting the most appropriate mapping strategy based on various criteria. In some embodiments, such as if, when each data point in the source has a direct, singular corresponding point in the destination, mapping strategy module 124 may select a one-to-one mapping. In some embodiments, such as when a single data point in the source corresponds to multiple data points in the destination (e.g., an order with multiple items), mapping strategy module 124 may select a one-to-many mapping. In some embodiments, such as when multiple data points from the source relate to multiple data points in the destination, mapping strategy module 124 may select a many-to-many mapping.

When determining the mapping strategy, mapping strategy module 124 may be configured to consider a variety of factors, such as, but not limited to one or more of: a complex data structure with nested relationships might require one-to-many or many-to-many mappings, a mapping strategy is chosen based on the desired outcomes of the data integration, such as consolidating data, transforming it for analysis, or preserving complex relationships, the efficiency of different mapping strategies and opt for simpler mappings when possible, and the like.

In some embodiments, mapping strategy module 124 may its final or ultimate determination by weighing the insights and factors to choose the integration strategy that is most appropriate for the integration task, which ensures that the mapping is accurate, efficient, and aligned with the integration's overall goals.

As a result of this approach, mapping strategy module 124 can be adapted to a wide range of data integration scenarios, providing flexibility and precision when mapping data between systems.

In some embodiments, such as when data sources 108 includes real-time data sources, as new data streams are received by into the system, mapping strategy module 124 may be configured to continuously optimize the mapping process in real-time by, for example, adapting to changes in the data landscape, ensuring that mappings remain accurate and up-to-date even as the underlying data evolves.

Once the mapping strategies are defined, power mapper system 116 may be configured to execute the mapping process. In some embodiments, power mapper system 116 may transforms data from data source 108 according to the mapping rules defined by user device 102, creating associations between corresponding data elements across different datasets.

In some embodiments, before moving data to its destination, a variety of tasks may be performed in order to process the data effectively. These tasks can include, but are not limited to, one or more of removing duplicates, filling in missing values, standardizing the data, and/or joining or merging different datasets. Other steps may involve filtering out outliers, transforming data, aggregating information, and encoding it for optimal use. More advanced techniques such as feature engineering (e.g., creating new features to enhance performance of a model), anonymization (e.g., to protect the privacy of users by masking or removing identifiable information), resampling, text normalization, and dimensionality reduction (such as PCA) may also be utilized. All of these operations play a crucial role in ensuring that the data is clean, consistent, and well-suited for analysis or other applications. Ultimately, this results in improved performance and accurate outcomes.

Interface module 126 may be configured to generate a graphical user interface that allows an end user to visualize the mappings generated by pattern recognition module 122 and/or mapping strategy module 124. For example, interface module 126 may be configured to generate and provide users with an intuitive interface for defining mapping rules, validating mappings, and/or monitoring transformations in an easy to use interface, which assists in simplifying the integration process and enhancing user productivity. Exemplary graphical user interfaces are discussed in more detail below, in conjunction with FIGS. 3A-3E.

Figure 2:
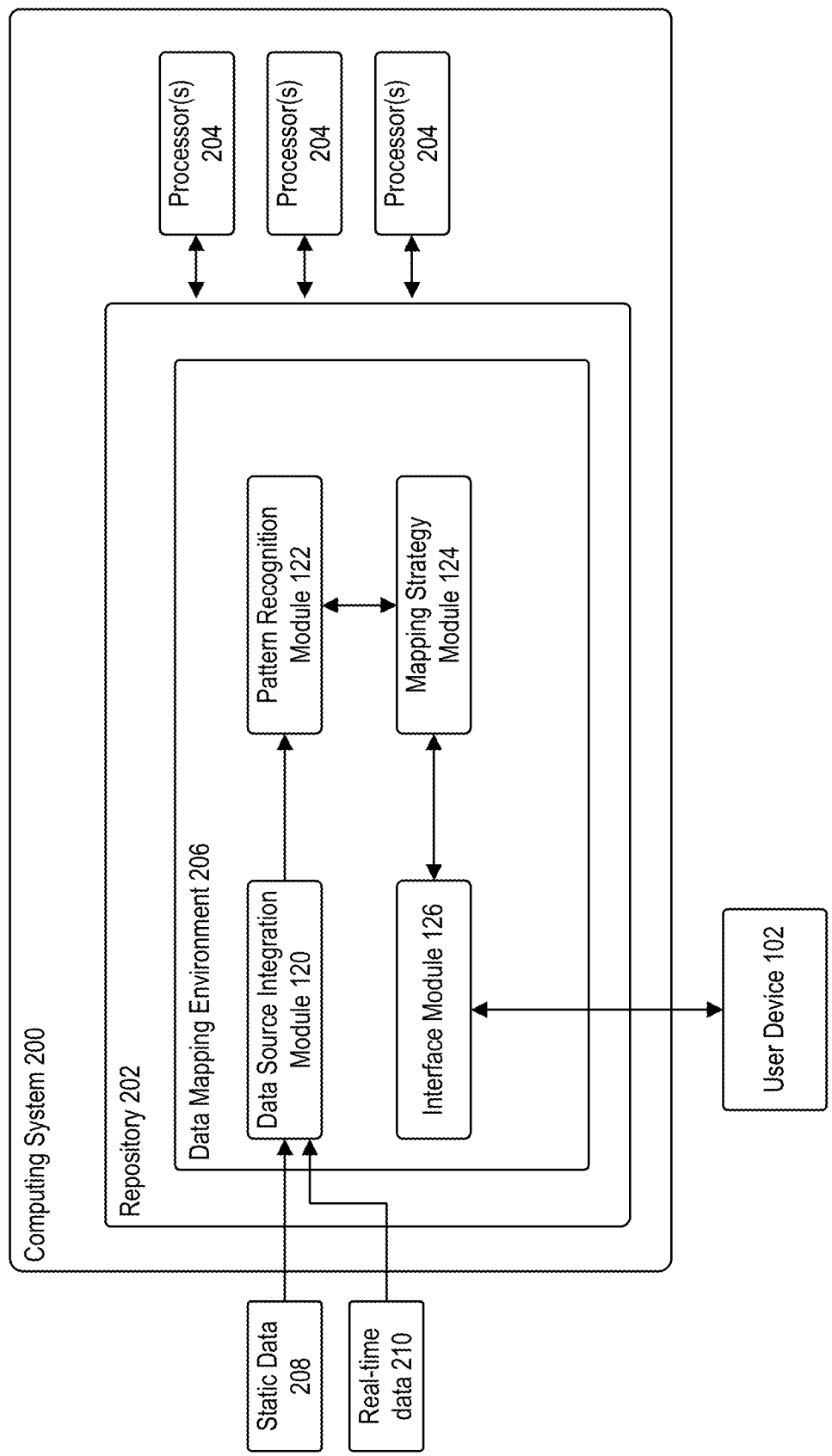
FIG. 2 is a block diagram illustrating a computing environment, according to example embodiments.

FIG. 2 is a block diagram illustrating computing system 200, according to example embodiments. As shown, FIG. 2 may represent an example environment in which power mapper system may generate a data mapping. Computing system 200 may include a repository 202 and one or more computer processors 204.

Repository 202 may be representative of any type of storage unit and/or device (e.g., a file system, database collection of tables, or any other storage mechanism) for storing data. In some embodiments, repository 202 may include multiple different storage units and/or devices. The multiple different storage units and/or devices may or may not be of the same type or located at the same physical site. As shown, repository 202 may include a data mapping environment 206.

Power mapper system 116 may execute one or more operations within data mapping environment 206 to facilitate a data mapping process between a selected source and a selected destination. As shown, in operation, data source integration module 120 may interface with one or more data sources that may include, for example, static data 208 and/or real-time data 210. Pattern recognition module 122 may be configured to employ one or more artificial intelligence models or statistical models to recognize patterns and relationships within the data by identifying commonalities, dependencies, and structures that exist across the data sets included in the data. Mapping strategy module 124 may generate a strategy of mapping data from the data source(s) to the selected destination(s) based on insights gained from the pattern and relationship recognitions identified by pattern recognition module 122. Mapper system 116 may be configured to execute the mapping strategy generated by mapping strategy module 124. Interface module 126 may be configured generate a graphical user interface that allows users to visualize the mapping generated by pattern recognition module 122 and mapping strategy module 124, which may be provided to user device 102 for display.

In some embodiments, user device 102 may modify or adjust mappings or data transformations via the interface generated by interface module 126. In such embodiments, interface module 126 may communicate the adjustments to one or more of pattern recognition module 122 and/or mapping strategy module 124 for further analysis and/or execution.

In some embodiments, such as when additional real-time data 210 is received, the workflow shown in FIG. 2 may continue, such that pattern recognition module 122 and mapping strategy module 124 may analyze the new data for further analysis and/or execution.

Figure 3A:
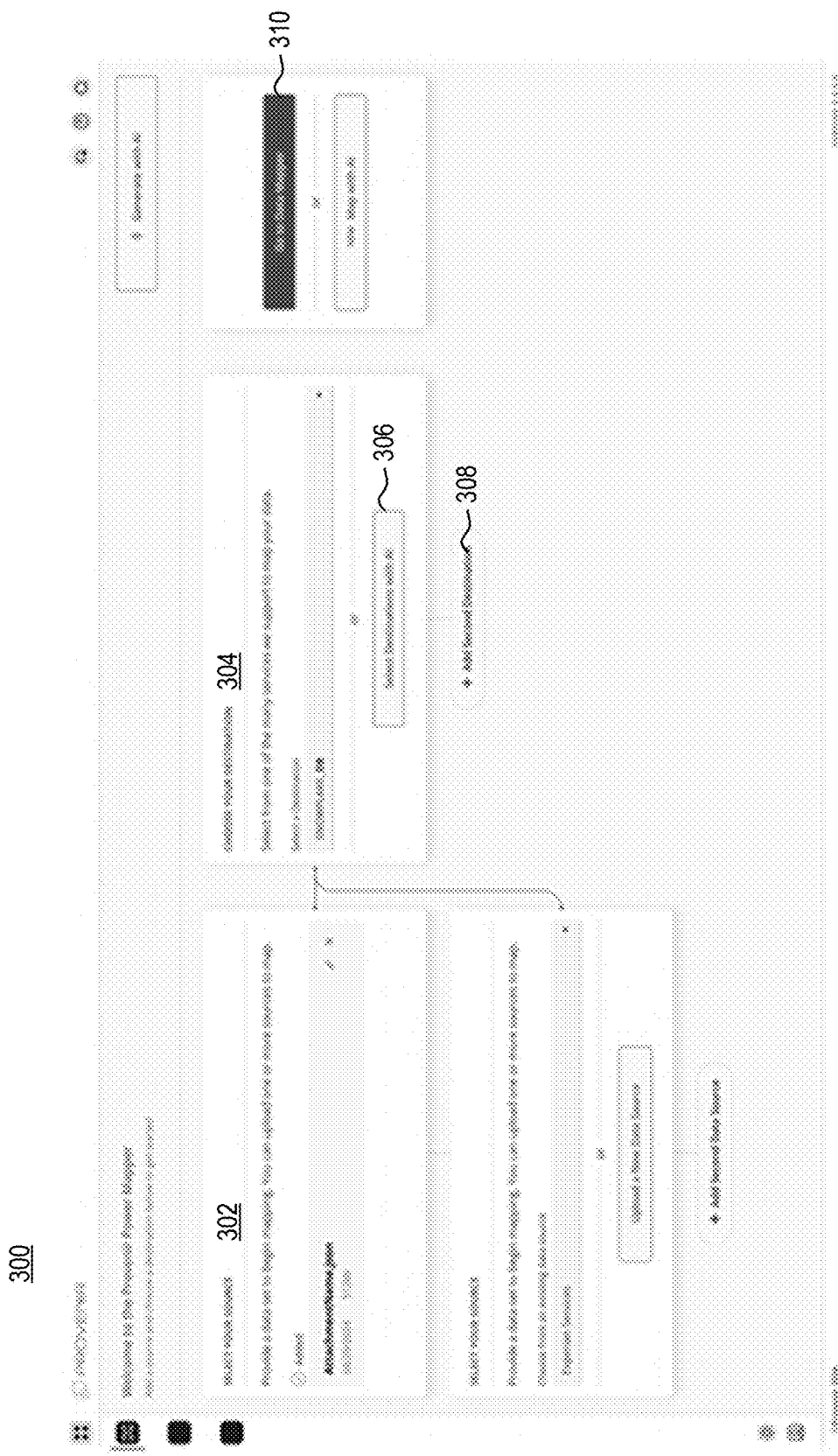
FIGS. 3A-3E are exemplary graphical user interfaces, according to example embodiments.

FIG. 3A illustrates an exemplary graphical user interface (GUI) 300 associated with power mapper system 116 and application 110, according to example embodiments. In some embodiments, GUI 300 may be generated by interface module 126 and sent to user device 102 for display via application 110. As shown, GUI 300 may be configured to allow users to map data between different sources and destinations. GUI 300 may include a select source section 302 and a choose destination section 304.

Select source section 302 may allow end users to upload or select a file or database for upload. The one or more data sets contained in the file or database may be analyzed by power mapper system 116. As shown, GUI 300 currently displays that "AttachmentName.json" was successfully uploaded and includes the details of the uploaded file (e.g., upload date (Apr. 29, 2024) and file size (512 kb). In some embodiments, select source section 302 may allow end users to select a data source from pre-existing sources (e.g., "Experian Services") or upload a new data source. In some embodiments, select source section 302 may allow end users to upload multiple data sources for analysis.

Destination source section 304 may allow end users to select a destination for the mapped data. For example, as shown, destination section 304 may include a dropdown menu that allows end users to select a source destination. In this particular example, "SNOWFLAKE DB" is selected as the destination for the mapped data. In some embodiments, destination source section 304 may include two graphical elements: select destination with AI button 306 and add second destination element 308. Select destination with AI button 306 may be configured to trigger power mapper system 116 to intelligently select where the mapped data should be stored. For example, when AI button 306 is selected, power mapper system 116 may intelligently determine and select the optimal destination for the mapped data. As a result, power mapper system 116 may be configured to suggest the most appropriate storage location based on the data characteristics, the context, and other parameters. This functionality may also allow end user to specify additional destinations for the mapped data when it is activated or selected. For example, in various scenarios in which data needs to be replicated or distributed across multiple systems for redundancy, performance, or compliance reasons, this could be useful. In some embodiments, the AI-based selection mechanism may take into account a variety of characteristics of the data, such as, but not limited to data type, volume, access patterns, cost, compliance requirements, and/or historical usage. Mapping strategy module 124 may then map the data to multiple destinations using power mapper system's 116 ability to replicate and distribute data seamlessly across different databases and storage systems.

With this setup, users can either manually choose where their data should go or let power mapper system 116 make intelligent choices for them, as well as handle complex data storage requirements involving multiple destinations. Add second destination element 308, when actuated or selected, may allow end users to request power mapper system 116 to map data to multiple destinations.

As shown, in some embodiments, GUI 300 may further include graphical element 310. Graphical element 310 may trigger interface module 126 to generate and/or send to user device 102 a new GUI representing the mapped data generated by power mapper system 116. The new GUI is discussed in further detail below in conjunction with FIG. 3B.

Figure 3B:
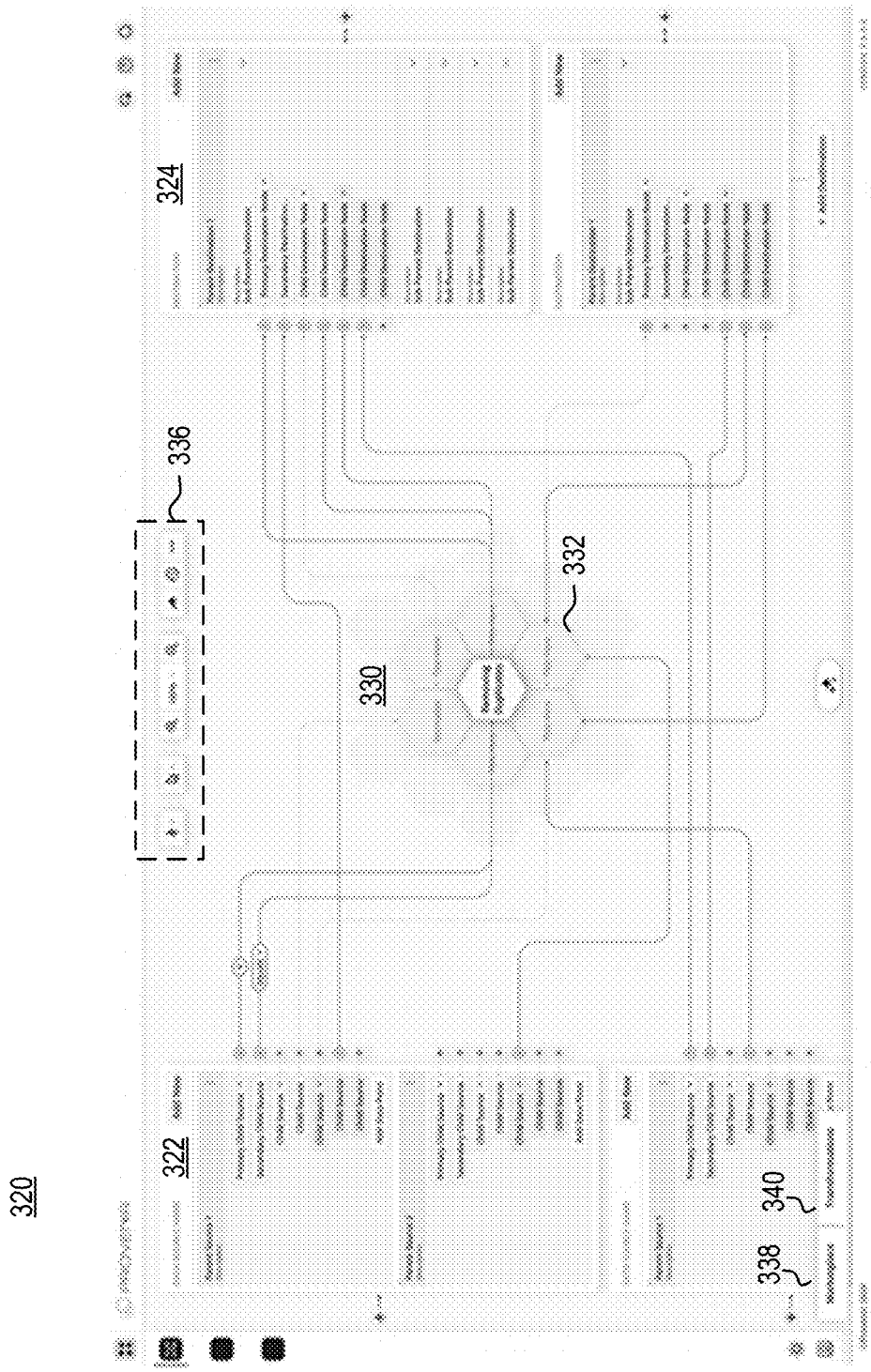

FIG. 3B illustrates an exemplary GUI 320 associated with power mapper system 116 and application 110, according to example embodiments. In some embodiments, GUI 320 may be generated by interface module 126 and sent to user device 102 for display via application 110. As shown, GUI 320 may be configured to allow users to set up, visualize, and or manage dynamic data mappings and transformations.

GUI 320 may include a first panel 322 and a second panel 324. First panel 322 may correspond to a panel of data sources. For example, as shown, first panel 322 may include a list of multiple data sources. In some embodiments, a data source may include a hierarchy of primary and secondary data sources. An example of a primary and secondary data source in the context of a SaaS credit decisioning system is as follows:

Primary Data Source—as a SaaS credit decisioning system, this platform manages all credit-related data, including credit applications, customer credit scores, financial histories, risk assessments, and decision outcomes. Since it consolidates and processes all data relevant to credit decisioning across various products and customers, it serves as the primary data source.

Secondary Data Source Example—a credit risk assessment module is a unique component of the SaaS credit decisioning system that concentrates on determining the risk associated with credit applications. It utilizes advanced risk scores, fraud detection indicators, and predictive models to evaluate the possibility of default. As a secondary source, it obtains data from the primary system but delves into the nuanced elements of credit risk to provide crucial insights for decision-making.

In another example, in the context of a SaaS credit decisioning system that handles data and processes related to customer credit applications, decisions, and outcomes, the secondary data source may be a loan performance monitoring module that monitors delinquencies, defaults, and early repayments within the credit decision system. In this example, the primary data source may provide overarching credit decisioning data and the secondary data source may provide a more detailed or domain-specific information that can be mapped, filtered, or processed differently depending on the user's requirements.

GUI 320 may be configured to allow users to add new data sources or child sources within each parent source, enhancing the overall flexibility of mapping data from different sources. Second panel 324 may correspond to a panel of destinations. For example, similar to the panel of data sources, second panel 324 may list destinations where the data may be mapped. In some embodiments, each destination can include multiple child nodes, which can be expanded or collapsed.

GUI 320 may further include a central region 330. Central region 330 may include a plurality of transformation nodes 332. Each transformation node 332 may correspond to a data transformation operation. Exemplary transformation operations may include but are not limited to:

Normalization—e.g., standardizing data values without distorting the range of values.

Duplicate Removal—e.g., ensuring data integrity by identifying and removing duplicate records.

Outlier Filtering—e.g., utilizing statistical methods to detect and remove data points that deviate significantly from the rest of the dataset.

Missing Value Imputation—e.g., missing values may be imputed by, for example, providing estimated values based on various methods, such as mean, median, or predictive models, to fill in missing or incomplete data.

Data Conversion—e.g., convert data from one format or type to another, such as string to integer or datetime to timestamp.

Data Aggregation—e.g., calculate sums, averages, counts, mins, and maxes based on specified groups of data.

Merge or join operations—e.g., combine data from multiple sources or tables using a common key.

Data Splitting—e.g., divide a single column into multiple columns, or a dataset into subsets.

Variable Encoding—e.g., categorical variables may be encoded by, for example, using one-hot encoding or label encoding to convert categorical data into numerical format.

Data Transformation—e.g., calculating numeric values by taking the logarithm, square root, or exponential of them.

Data Sorting—e.g., sort data in ascending or descending order based on specified columns or fields.

Data Filtering—e.g., filter data by selecting and retaining rows of data that meet certain criteria.

Pivot/Unpivot Data—e.g., convert data between wide and long formats, usually for analysis or visualization.

Data Sampling—e.g., adjust the frequency of data, which is particularly useful when analyzing time series (e.g., downsampling or upsampling).

Concatenate Data—e.g., merge multiple datasets along a specific axis or combines data from multiple columns into one column.

Flatten Nested Structures—e.g., convert nested or hierarchical data structures into flat tables.

Custom Functions—perform a user-defined function or script on the data, allowing for custom transformations not covered by standard operations.

Data Grouping—e.g., grouping data by one or more columns and applies aggregate functions to each group.

Null/NaN Removal—e.g., remove rows or columns with null or NaN values.

Data Flow Visualization—e.g., within the system interface, the flow of data can be viewed as lines that connect sources on the first panel to chosen transformation nodes in the central region. These nodes represent listed operations and illustrate how data is transformed from its source to its destination. By selecting and organizing these nodes, users can establish the order of operations for the data mapping procedure.

Users may be able to select one or more transformation node 332, such that the selected transformation operation may be performed during the data mapping process. Using a specific example, as shown, the data flow from first panel 322 to second panel 324 may pass through a number of transformation nodes 332, such as "normalize" transformation node and "remove duplicates" transformation node. In this manner, the flow of data from first panel 322 to second panel 324 may be visualized by lines connecting the sources to the transformations and onward to the destinations.

In some embodiments, GUI 320 may further include a toolbar 336. Toolbar 336 may include one or more icons to facilitate user interaction and mapping configuration management. Exemplary icons may include, but are not limited to save, undo, redo, zoom options, search, and the like.

In some embodiments, GUI 320 may further include graphical elements 338 and 340. Graphical element 338 may correspond to a marketplace button, the functionality of which is discussed in more detail below in conjunction with FIG. 3C. Graphical element 340 may correspond to a transformation button, the functionality of which is discussed in more detail below in conjunction with FIG. 3D.

Figure 3C:
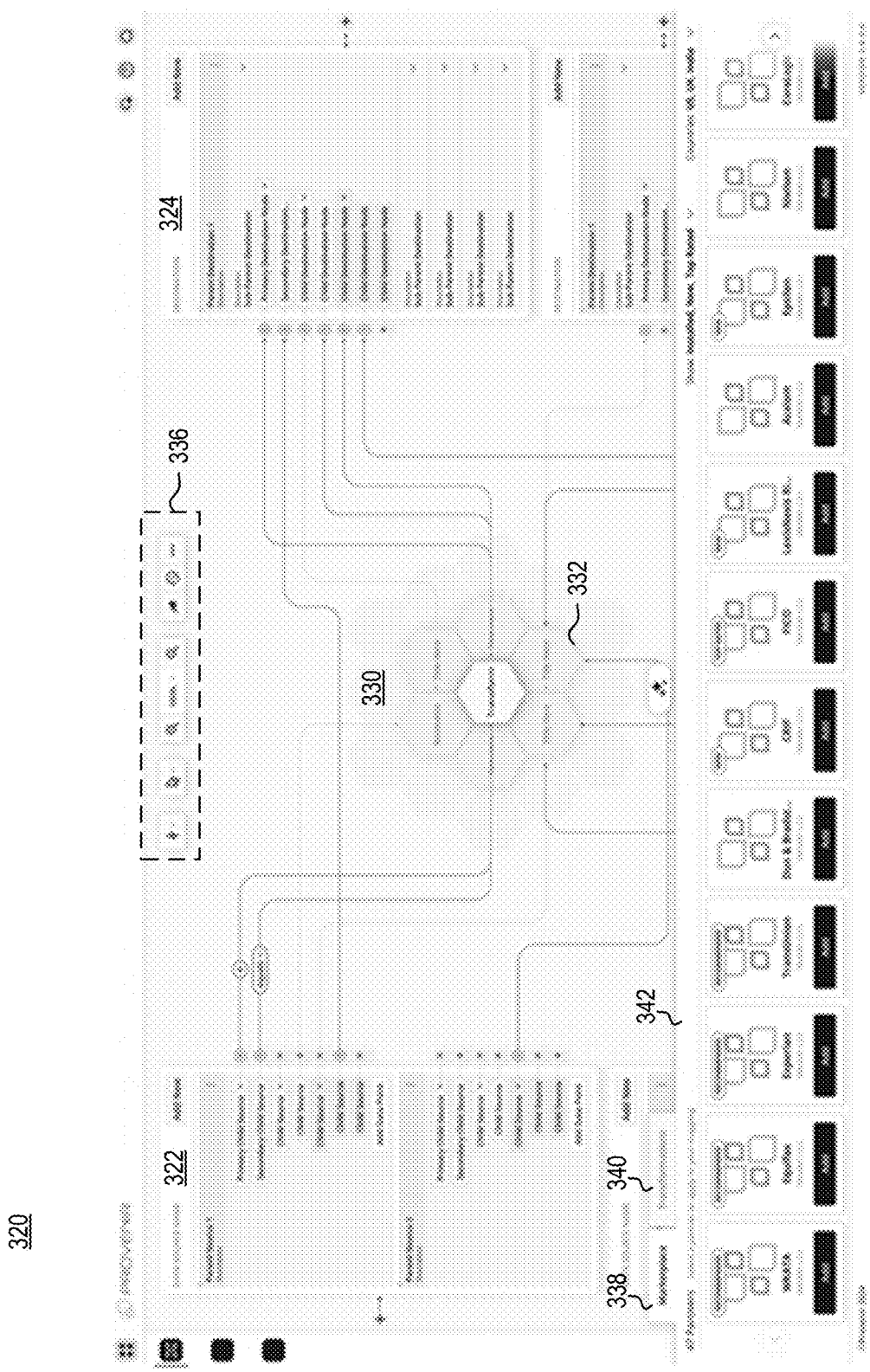

FIG. 3C illustrates another view of GUI 320 associated with power mapper system 116 and application 110, according to example embodiments. In some embodiments, GUI 320 may be updated to reveal a marketplace toolbar 342 responsive to a user interacting with graphical element 338. Marketplace toolbar 342 may include various data integration solutions from different third party data sources, such as, but not limited to, WKATA, Equifax, Experian, TransUnion, and others. Each third party data source may be presented with options to add them to the mapping workflow. In some embodiments, one or more third party data sources may be tagged with labels, such as, for example, "recommended," "new," and "top rated," to provide users with guidance on the utility and popularity of each option.

Figure 3D:
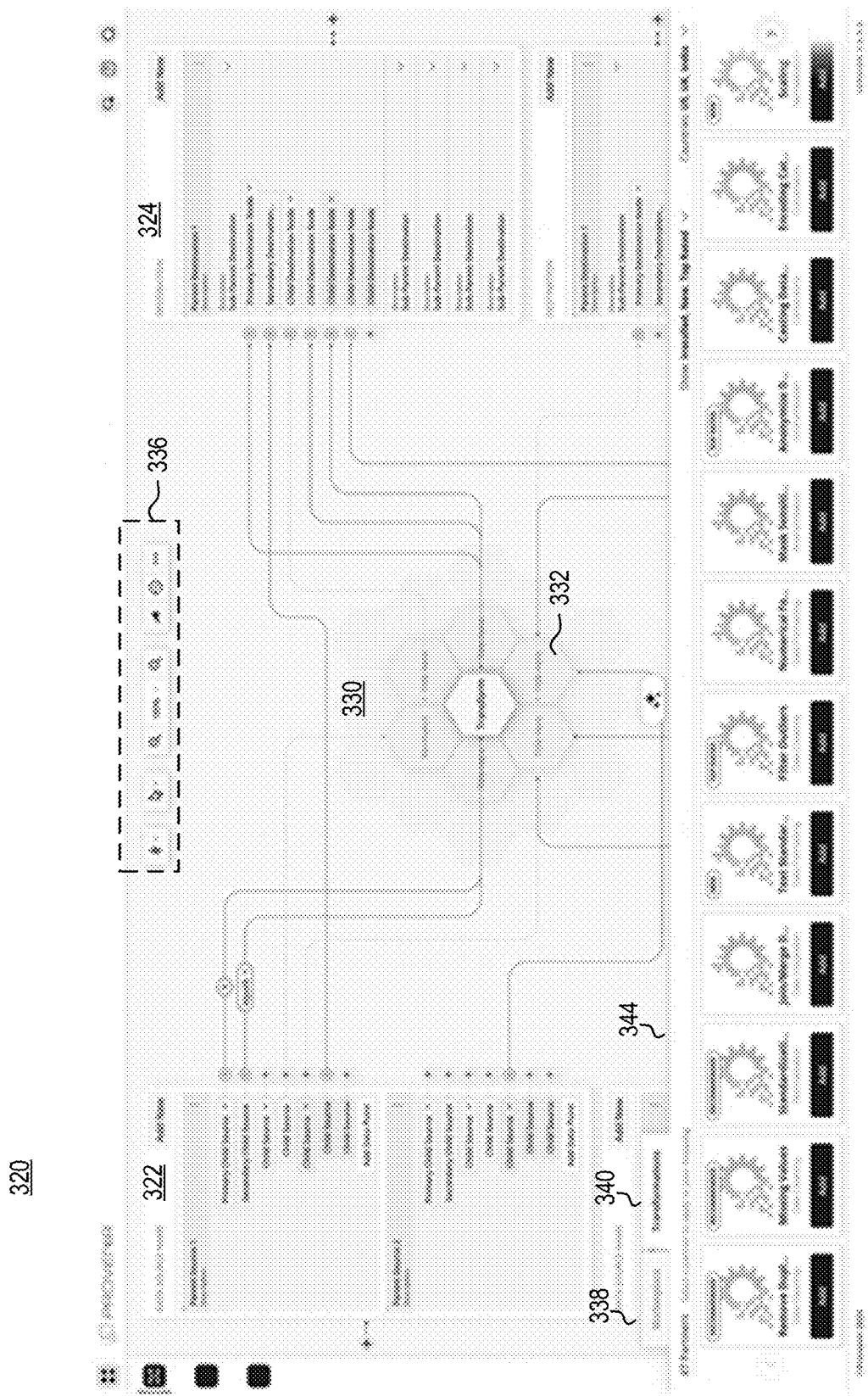

FIG. 3D illustrates another view of GUI 320 associated with power mapper system 116 and application 110, according to example embodiments. In some embodiments, GUI 320 may be updated to reveal a transformation toolbar 344 responsive to a user interacting with graphical element 340. Transformation toolbar 344 may include various data transformation operations, such as, but not limited to "remove duplicates," "missing values," "standardization," and the like. In some embodiments, one or more transformation operations may be tagged with labels, such as, for example, "recommended," "new," and "top rated," to provide users with guidance on the utility and popularity of each option.

Figure 3E:
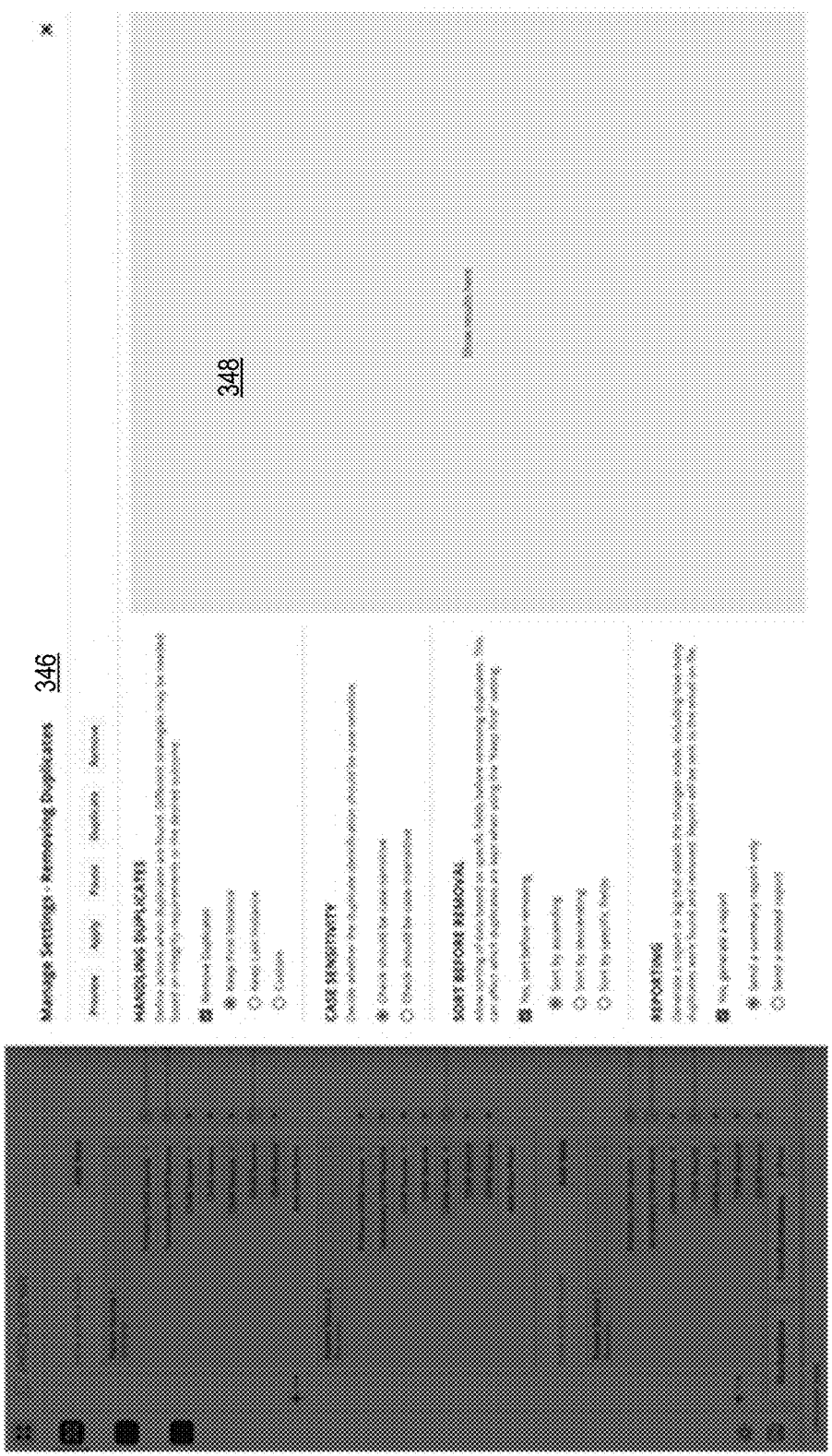

FIG. 3E illustrates another view of GUI 320 associated with power mapper system 116 and application 110, according to example embodiments. In some embodiments, GUI 320 may be updated to reveal a settings overlay window 346 responsive to a user selecting a data transformation option from transformation toolbar 344. As shown, in the specific example illustrated in FIG. 3E, the selected data transformation operation is "remove duplicates." Via overlay window 346, users may be able to customize the handling of the data transformation operation (e.g., remove duplicates) based on specific criteria, thus improving data quality and integrity.

As shown, overlay window 346 may include a number of options for managing duplicates, including, for example, "remove duplicates," "keep first instance," "keep last instance," and "custom," which allows users to choose the behavior that best suits their data integrity standards. Such options may allow for tailored data handling by preserving essential data while removing redundant data.

In some embodiments, overlay window 346 may allow the user to specify whether the data transformation is case-sensitive. For example, overlay window 346 may include checkboxes for whether the duplicate check should be case sensitive or case insensitive.

In some embodiments, overlay window 346 may include options for when the duplicate removal process should occur. For example, data may be sorted before duplicates are removed or after duplicates are removed. In some embodiments, overlay window 346 may also include options for determining which duplicates to remove based on sorting order, giving precise control over data cleansing.

In some embodiments, overlay window 346 may further include options for generating reports after duplicates are handled. For example, users can choose to "send a summary report only" or "send a detailed report," ensuring transparency and traceability in data processing. Compliance and auditing processes can be supported by sending these reports automatically to the email on file.

In some embodiments, overlay window 346 may further include action buttons, which may include one or more actions, such as, but not limited to "preview," "apply," "pause," "duplicate," and "remove." The action buttons may allow to test, apply, or modify settings in real-time. For users handling large datasets, this functionality significantly increases efficiency and usability.

When the user clicks the "preview" button, the system begins processing the data according to the transformation settings. When generating previews of large datasets, power mapper system 116 may process a sample of the data rather than the entire dataset to ensure the preview is generated quickly. Based on the dataset and the transformations applied, this sampling may be random or based on specific criteria. In some embodiments, power mapper system can apply the selected data transformation operations (e.g., normalize, remove duplicates, filter data) in real-time to the sample data. To generate the preview, in the overlay window's preview area, power mapper system 116 may render a preview of the transformed sample data. This preview allows the user to see how the data will look immediately after the transformation. Power mapper system 116 may then cause the preview to be displayed to the user. In some embodiments, the preview may be presented in an overlay window. For example, a modal interface element overlays the main application, allowing the user to concentrate on the transformation details without having to leave the primary interface. In some embodiments, power mapper system 116 may provide a dedicated preview area in the overlay window where transformed data can be seen clearly and concisely. This area may be intended to include the effects of the selected transformations. A preview might be presented as a tabular table, a chart, or another visual representation of how the transformations have changed the data.

Based on the preview, power mapper system 116 may receive feedback in real-time. For example, users can adjust settings or select different transformation nodes in real-time, which may cause updates to the preview area. In this way, the user can determine the impact of their changes immediately and make any necessary adjustments before applying the transformations to the entire dataset.

In some embodiments, users can interact with the preview by toggling between different transformation settings, pausing the preview, duplicating the settings for further modification, or removing transformations altogether. As a result of this interactive approach, users are able to refine their transformations iteratively before they are committed to the entire dataset, which enhances usability.

By offering this preview functionality, power mapper system 116 significantly improves the user experience, especially for those working with large datasets, by allowing them to experiment with and verify their transformation settings in a controlled, real-time environment before implementing them broadly.

In some embodiments, overlay window 346 may further include a preview area 348. Preview area 348 may be configured to provide the users with a preview of their selected data transformation option and settings such that users can see real-time feedback and the effects of their settings changes directly within the modal, assisting them with immediate verification and adjustment.

By providing comprehensive, customizable tools that adapt to various data governance needs, overlay window 346 provides functionality that is part of a broader data management system designed to streamline and optimize the handling of complex data sets.

Figure 4:
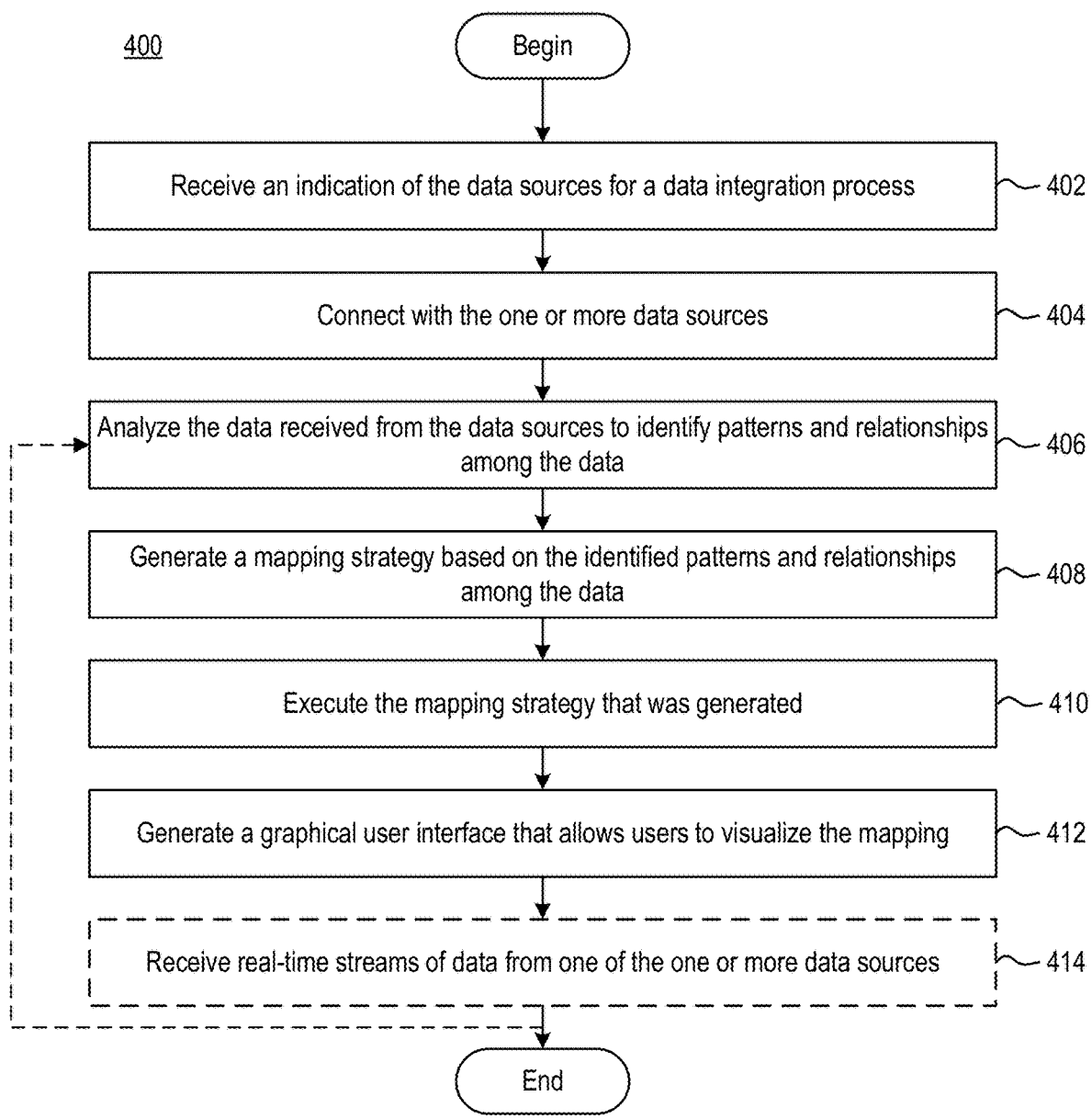
FIG. 4 is a flow diagram illustrating a method of data integration, according to example embodiments.

FIG. 4 is a flow diagram illustrating a method 400 of performing a data integration, according to example embodiments. Method 400 may begin at step 402.

At step 402, server system 104 may receive an indication of the data sources for the data integration process. In some embodiments, server system 104 may identify the data sources for the data integration process based on a file uploaded by the end user via application 110. In some embodiments, server system 104 may identify the data sources based on a selected third party data source from the data source market place. In some embodiments, the selected data source may include static data sets stored in databases or files. In some embodiments, the selected data sources may include non-static data sets, such as live streaming data feeds.

At step 404, server system 104 may connect with one or more of the indicated data sources. For example, server system 104 may connect with one or more static or non-static data sources using one or more techniques described above.

At step 406, server system 104 may analyze the data received from the data sources to identify patterns and relationships among the data. For example, power mapper system 116 may employ one or more artificial intelligence models or statistical models to recognize patterns and relationships within the data by identifying commonalities, dependencies, and structures that exist across the data sets included in the data. In some embodiments, pattern recognition module 122 may select a particular artificial intelligence model or statistical model based on the type of data in the data sets. In this manner, pattern recognition module 122 may be able to dynamically adapt to different data types, ensuring that the best model for analyzing the data is selected.

At step 408, server system 104 may generate a mapping strategy based on the identified patterns and relationships among the data. For example, mapping strategy module 124 may generate a strategy of mapping data from the data source(s) to the selected destination(s) based on insights gained from the pattern and relationship recognitions identified by pattern recognition module 122. In some embodiments, mapping strategy module 124 may generate the mapping strategy by determining whether a one-to-one, one-to-many, or many-to-many mapping approach is appropriate, considering factors such as data complexity and desired outcomes.

At step 410, server system 104 may execute the mapping strategy defined by mapping strategy module 124. In some embodiments, executing the mapping strategy may involve applying one or more data transformed defined by the user in the initiation process. Exemplary transformation operations may include, but are not limited to, duplicate removal, missing value imputation, data standardization, join/merge operations, filter outliers, and the like At step 412, server system 104 may generate a graphical user interface that allows users to visualize the mapping generated by pattern recognition module 122 and mapping strategy module 124. Via the graphical user interface, users can edit data sources, data mappings, data transformations, data destinations, and the like.

In some embodiments, method 400 may further include step 414. At step 414, server system 104 may receive real-time streams of data for one of the selected data sources. Responsive to receiving real-time streams of additional data, method 400 may revert to step 406 for further analysis based on the new data.

Example Workflow

The following example is a workflow that includes sequences of events and processes that may occur when interacting with power mapper system 116 and a GUI generated by power mapper system 116.

As a user interacts with the data mapping within the system, one or more events or processes occur. The GUI may be configured to visually present the data mappings created by the system's pattern recognition module and mapping strategy module. By visualizing the connections between data sources, transformations, and destinations, users can gain a better understanding of them. In some embodiments, the connections may be presented as a flowchart or network diagram, with nodes representing data sources, transformation operations, and data destinations, and lines or arrows indicating data flow. In some embodiments, data sources can be modified using the GUI, including selecting different data sources, adding new ones, or removing existing ones. Changes are reflected in real-time within the GUI. In some embodiments, data mappings may be edited by users themselves, such as by adjusting the mapping between source fields and destination fields. Users may drag and drop connections, create new mappings, or adjust existing mappings.

In some embodiments, the GUI may further allow allows users to add, remove, or modify transformation nodes within the mapping. These nodes represent operations such as normalization, filtering, or aggregation. Data can be transformed as it moves from source to destination using these transformations.

In some embodiments, the user can interact with the GUI to configure data destinations. For example, via the GUI, users can choose different databases, files, or other storage locations where the mapped and transformed data will be sent.

Once the constraints are set up, power mapper system 116 may begin real-time data processing. For example, power mapper system 116 may integrate real-time data into the existing mapping process as it arrives if the selected data source includes streaming data in real-time. Once the real-time data is integrated, power mapper system 116 may perform a dynamic reanalysis. For example, power mapper system 116 may trigger a reanalysis of the data mapping process as new real-time data streams in. To ensure that the mapping strategy and pattern recognition modules remain accurate and effective based on the new data, power mapper system 116 may reassess the mappings and transformations. In some embodiments, power mapper system 116 may automatically adjust the mappings and transformations or provide suggestions for adjustments that the user can review and implement. By continuously integrating new data into the mapping process, and providing real-time feedback within the GUI, the process may ensure the mappings are always up-to-date and optimized.

The following are examples of user actions and system responses:

Updates in real time—as users interact with the mapping (e.g., by editing mappings, applying transformations), power mapper system 116 may process these changes in real-time. Interface module 126 may update the GUI instantly as the new configurations are reflected in the data flow.

Immediate validation—power mapper system 116 may provide immediate validation or error-checking to ensure that the mappings and transformations are logically sound. Any issues (e.g., incompatible data types, missing connections) are flagged for the user to fix.

Data reprocessing—in order to enable the user to see how the changes affect the data before fully committing to the changes, power mapper system 116 may reprocess the relevant data through the updated mappings and transformations.

As soon as the user is satisfied with the mappings and transformations, they can commit them. Power mapper system 116 may apply these configurations to the entire data set, processing and transforming it accordingly.

For real-time data sources, power mapper system 116 may continually or periodically monitor incoming data streams and applies the finalized mappings and transformations as they arrive. Mappings can be updated dynamically if necessary.

Using this interactive process, users have precise control over how data is mapped, transformed, and directed, with real-time adjustments based on data and system feedback.

Figure 5A:
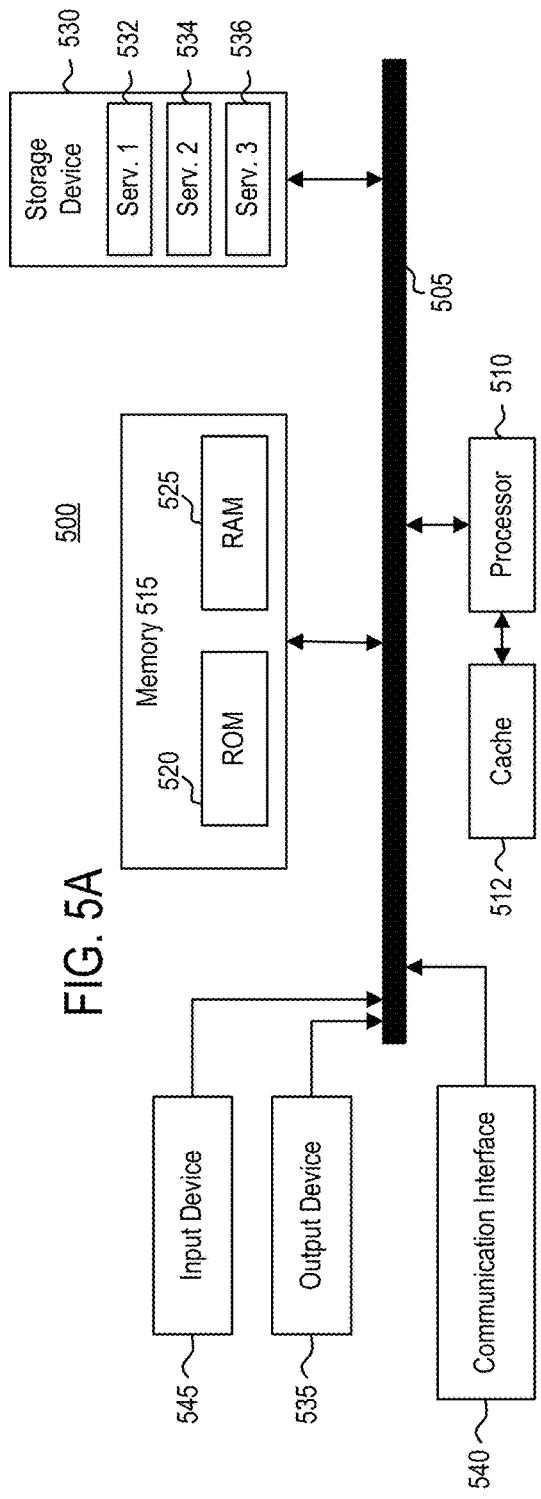
FIG. 5A is a block diagram illustrating a computing device, according to example embodiments of the present disclosure.

FIG. 5A illustrates a system bus architecture of computing system 500, according to example embodiments. System 500 may be representative of at least user device 102 or server system 104. One or more components of system 500 may be in electrical communication with each other using a bus 505. System 500 may include a processing unit (CPU or processor) 510 and a system bus 505 that couples various system components including the system memory 515, such as read only memory (ROM) 520 and random-access memory (RAM) 525, to processor 510.

System 500 may include a cache of high-speed memory connected directly with, in close proximity to, or integrated as part of processor 510. System 500 may copy data from memory 515 and/or storage device 530 to cache 512 for quick access by processor 510. In this way, cache 512 may provide a performance boost that avoids processor 510 delays while waiting for data. These and other modules may control or be configured to control processor 510 to perform various actions. Other system memory 515 may be available for use as well. Memory 515 may include multiple different types of memory with different performance characteristics. Processor 510 may include any general-purpose processor and a hardware module or software module, such as service 1 532, service 2 534, and service 3 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system 500, an input device 545 may represent any number of input mechanisms, such as a microphone for speech, a touch-sensitive screen for gesture or graphical input, keyboard, mouse, motion input, speech and so forth. An output device 535 may also be one or more of a number of output mechanisms known to those of skill in the art. In some instances, multimodal systems may enable a user to provide multiple types of input to communicate with computing system 500. Communications interface 540 may generally govern and manage the user input and system output. There is no restriction on operating on any particular hardware arrangement and therefore the basic features here may easily be substituted for improved hardware or firmware arrangements as they are developed.

Storage device 530 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 may include services 532, 534, and 536 for controlling the processor 510. Other hardware or software modules are contemplated. Storage device 530 may be connected to system bus 505. In one aspect, a hardware module that performs a particular function may include the software component stored in a computer-readable medium in connection with the necessary hardware components, such as processor 510, bus 505, output device 535 (e.g., display), and so forth, to carry out the function.

Figure 5B:
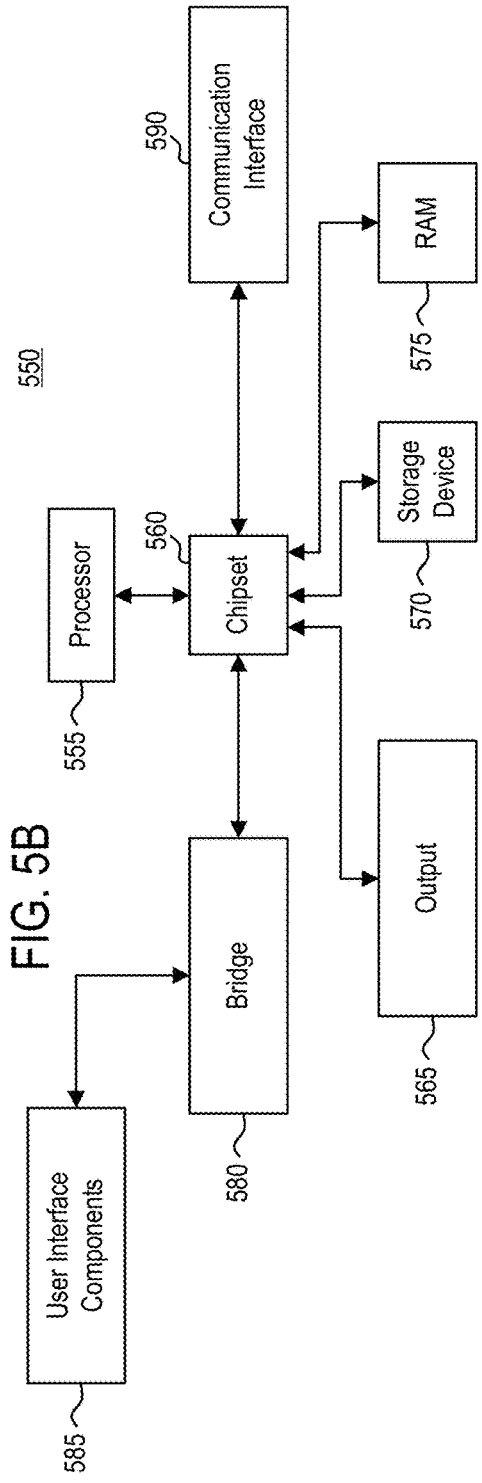
FIG. 5B is a block diagram illustrating a computing device, according to example embodiments of the present disclosure.

FIG. 5B illustrates a computer system 550 having a chipset architecture that may represent user device 102 or server system 104. Computer system 550 may be an example of computer hardware, software, and firmware that may be used to implement the disclosed technology. System 550 may include a processor 555, representative of any number of physically and/or logically distinct resources capable of executing software, firmware, and hardware configured to perform identified computations. Processor 555 may communicate with a chipset 560 that may control input to and output from processor 555.

In this example, chipset 560 outputs information to output 565, such as a display, and may read and write information to storage device 570, which may include magnetic media, and solid-state media, for example. Chipset 560 may also read data from and write data to storage device 575 (e.g., RAM). A bridge 580 for interfacing with a variety of user interface components 585 may be provided for interfacing with chipset 560. Such user interface components 585 may include a keyboard, a microphone, touch detection and processing circuitry, a pointing device, such as a mouse, and so on. In general, inputs to system 550 may come from any of a variety of sources, machine generated and/or human generated.

Chipset 560 may also interface with one or more communication interfaces 590 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 555 analyzing data stored in storage device 570 or storage device 575. Further, the machine may receive inputs from a user through user interface components 585 and execute appropriate functions, such as browsing functions by interpreting these inputs using processor 555.

It may be appreciated that example systems 500 and 550 may have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
receiving, by a computing system, an indication of one or more data sources for a data integration process, wherein the data integration process maps data from the one or more data sources to a selected destination;
interfacing, by the computing system, with the one or more data sources to receive the data for analysis;
analyzing, by the computing system, using one or more artificial intelligence models or one or more statistical models to recognize patterns and relationships within the data by identifying commonalities, dependencies, and structures that exist across the data, the analyzing comprising:
determining a type of data corresponding to the data being analyzed; and
selecting from a plurality of artificial intelligence models or a plurality of statistical models the one or more artificial intelligence models or the one or more statistical models based on the type of data being analyzed;
generating, by the computing system, a mapping strategy based on the identified patterns and the identified relationships in the data;
mapping, by the computing system, the data from the one or more data sources to the selected destination in accordance with the mapping strategy; and
generating, by the computing system, a graphical user interface that visualizes the mapping strategy for display on a user device, the generating comprising:
generating a first graphical element on a first side of a centerline of the graphical user interface, the first graphical element corresponding to the one or more data sources, the first graphical element comprising a plurality of sub-elements visually illustrating a hierarchy of the one or more data sources,
generating a second graphical element on a second side of the centerline of the graphical user interface, the second graphical element corresponding to the selected destination,
generating a third graphical element between the first graphical element and the second graphical element, the third graphical element comprising a plurality of transformation nodes, each of the plurality of transformation nodes triggering a data transformation to be performed during the mapping; and
a plurality of lines connecting the first graphical element to the second graphical element, wherein passage of a line of the plurality of lines through a transformation node of the plurality of transformation nodes applies the data transformation to the mapping.

2. The method of claim 1, further comprising:
receiving, by the computing system via the graphical user interface, a request to perform one or more data transformations during the mapping.

3. The method of claim 2, wherein mapping, by the computing system, the data from the one or more data sources to the selected destination in accordance with the mapping strategy comprises:
applying the one or more data transformations during the mapping, wherein the one or more data transformations are performed before or after the data is mapped from the one or more data sources to the selected destination.

4. The method of claim 2, further comprising:
generating, by the computing system, a preview of an effect of the one or more data transformations on the data mapping to be displayed as an overlay window on the graphical user interface.

5. The method of claim 1, wherein the data comprises real-time data.

6. The method of claim 5, further comprising:
receiving, by the computing system, updated real-time data from the one or more data sources; and
based on the receiving, repeating the analyzing, generating, and mapping steps for the updated real-time data.

7. A non-transitory computer readable medium comprising one or more sequences of instructions, which, when executed by a processor, causes a computing system to perform operations comprising:

receiving, by the computing system, an indication of one or more data sources for a data integration process, wherein the data integration process maps data from the one or more data sources to a selected destination;

interfacing, by the computing system, with the one or more data sources to receive the data for analysis;

analyzing, by the computing system, using one or more artificial intelligence models or one or more statistical models to recognize patterns and relationships within the data by identifying commonalities, dependencies, and structures that exist across the data, the analyzing comprising:

determining a type of data corresponding to the data being analyzed; and selecting from a plurality of artificial intelligence models or a plurality of statistical models the one or more artificial intelligence models or the one or more statistical models based on the type of data being analyzed;

generating, by the computing system, a mapping strategy based on the identified patterns and the identified relationships in the data;

mapping, by the computing system, the data from the one or more data sources to the selected destination in accordance with the mapping strategy; and generating, by the computing system, a graphical user interface that visualizes the mapping strategy for display on a user device, the generating comprising:

generating a first graphical element on a first side of a centerline of the graphical user interface, the first graphical element corresponding to the one or more data sources, the first graphical element comprising a plurality of sub-elements visually illustrating a hierarchy of the one or more data sources, generating a second graphical element on a second side of the centerline of the graphical user interface, the second graphical element corresponding to the selected destination, generating a third graphical element between the first graphical element and the second graphical element, the third graphical element comprising a plurality of transformation nodes, each of the plurality of transformation nodes triggering a data transformation to be performed during the mapping; and a plurality of lines connecting the first graphical element to the second graphical element, wherein passage of a line of the plurality of lines through a transformation node of the plurality of transformation nodes applies the data transformation to the mapping.

8. The non-transitory computer readable medium of claim 7, further comprising:

receiving, by the computing system via the graphical user interface, a request to perform one or more data transformations during the mapping.

9. The non-transitory computer readable medium of claim 8, wherein mapping, by the computing system, the data from the one or more data sources to the selected destination in accordance with the mapping strategy comprises:

applying the one or more data transformations during the mapping, wherein the one or more data transformations are performed before or after the data is mapped from the one or more data sources to the selected destination.

10. The non-transitory computer readable medium of claim 8, further comprising:

generating, by the computing system, a preview of an effect of the one or more data transformations on the data mapping to be displayed as an overlay window on the graphical user interface.

11. The non-transitory computer readable medium of claim 7, wherein the data comprises real-time data.

12. The non-transitory computer readable medium of claim 11, further comprising:

receiving, by the computing system, updated real-time data from the one or more data sources; and based on the receiving, repeating the analyzing, generating, and mapping steps for the updated real-time data.

13. A computing system, comprising:

a processor; and a memory having programming instructions stored thereon, which, when executed by the processor, causes the computing system to perform operations comprising:

receiving, by the computing system, an indication of one or more data sources for a data integration process, wherein the data integration process maps data from the one or more data sources to a selected destination;

interfacing, by the computing system, with the one or more data sources to receive the data for analysis;

analyzing, by the computing system, using one or more artificial intelligence models or one or more statistical models to recognize patterns and relationships within the data by identifying commonalities, dependencies, and structures that exist across the data, the analyzing comprising:

determining a type of data corresponding to the data being analyzed; and selecting from a plurality of artificial intelligence models or a plurality of statistical models the one or more artificial intelligence models or the one or more statistical models based on the type of data being analyzed;

generating, by the computing system, a mapping strategy based on the identified patterns and the identified relationships in the data;

mapping, by the computing system, the data from the one or more data sources to the selected destination in accordance with the mapping strategy; and generating, by the computing system, a graphical user interface that visualizes the mapping strategy for display on a user device, the generating comprising:

generating a first graphical element on a first side of a centerline of the graphical user interface, the first graphical element corresponding to the one or more data sources, the first graphical element comprising a plurality of sub-elements visually illustrating a hierarchy of the one or more data sources, generating a second graphical element on a second side of the centerline of the graphical user interface, the second graphical element corresponding to the selected destination, generating a third graphical element between the first graphical element and the second graphical element, the third graphical element comprising a plurality of transformation nodes, each of the plurality of transformation nodes triggering a data transformation to be performed during the mapping; and a plurality of lines connecting the first graphical element to the second graphical element, wherein passage of a line of the plurality of lines through a transformation node of the plurality of transformation nodes applies the data transformation to the mapping.

14. The system of claim 13, further comprising:
receiving, by the computing system via the graphical user interface, a request to perform one or more data transformations during the mapping.

15. The system of claim 14, wherein mapping, by the computing system, the data from the one or more data sources to the selected destination in accordance with the mapping strategy comprises:
applying the one or more data transformations during the mapping, wherein the one or more data transformations are performed before or after the data is mapped from the one or more data sources to the selected destination.

16. The system of claim 14, further comprising:
generating, by the computing system, a preview of an effect of the one or more data transformations on the data mapping to be displayed as an overlay window on the graphical user interface.

17. The system of claim 13, wherein the data comprises real-time data and the operations further comprise:
receiving, by the computing system, updated real-time data from the one or more data sources; and
based on the receiving, repeating the analyzing, generating, and mapping steps for the updated real-time data.

* * * * *